United States Patent [19]
Van Der Werf et al.

[11] Patent Number: 6,122,058
[45] Date of Patent: Sep. 19, 2000

[54] INTERFEROMETER SYSTEM WITH TWO WAVELENGTHS, AND LITHOGRAPHIC APPARATUS PROVIDED WITH SUCH A SYSTEM

[75] Inventors: Jan E. Van Der Werf, Eindhoven, Netherlands; Philippe J. L. Belien, Hasselt, Belgium; Johannes C. N. Rijpers, Eindhoven, Netherlands

[73] Assignee: ASM Lithography B.V., La Veldhoven, Netherlands

[21] Appl. No.: 09/103,733

[22] Filed: Jun. 24, 1998

[30] Foreign Application Priority Data

Dec. 22, 1997 [EP] European Pat. Off. .............. 97204065

[51] Int. Cl.[7] .................................................. G01B 9/02
[52] U.S. Cl. ........................................ 356/349; 356/358
[58] Field of Search .................................... 356/361, 349, 356/351

[56] References Cited

U.S. PATENT DOCUMENTS

| | | | |
|---|---|---|---|
| 4,251,160 | 2/1981 | Bouwhuis et al. | 356/401 |
| 4,356,392 | 10/1982 | Wittekoek et al. | 250/201 |
| 4,737,283 | 4/1988 | Gresch | 210/195.1 |
| 4,778,275 | 10/1988 | Van Den Brink et al. | 356/401 |
| 5,100,237 | 3/1992 | Wittekoek et al. | 356/401 |
| 5,404,222 | 4/1995 | Lis | 356/349 |
| 5,481,362 | 1/1996 | Van Den Brink et al. | 356/401 |
| 5,764,362 | 6/1998 | Hill et al. | 356/361 |
| 5,838,458 | 11/1998 | De Groot et al. | 356/361 |
| 5,838,485 | 11/1998 | De Groot et al. | 356/361 |

FOREIGN PATENT DOCUMENTS

| | | |
|---|---|---|
| 0498499B1 | 8/1992 | European Pat. Off. . |
| 0658810A1 | 6/1995 | European Pat. Off. . |
| WO9733205 | 9/1997 | WIPO . |

OTHER PUBLICATIONS

"Linear/Angular Displacement Interferometer For Wafer Stage Metrology", Gary E. Sommargren, SPIE Proc. vol. 1088, pp. 268–272.

Primary Examiner—Robert H. Kim
Assistant Examiner—Andrew H. Lee
Attorney, Agent, or Firm—Pillsbury Madison & Sutro LLP

[57] ABSTRACT

In an interferometer system, variations of the refractive index in the medium traversed by the measuring beam (123) can be detected by using two measuring beams (123, 125) having wavelengths which differ by a factor of three. For this choice of the wavelength ratio, the interference filters of the polarization elements, such as the beam splitter (127), the $\lambda/4$ plates (130, 131) and the antireflection coatings can be manufactured relatively easily, and the detection accuracy is increased.

24 Claims, 7 Drawing Sheets

INTERFEROMETER SYSTEM WITH TWO WAVELENGTHS, AND LITHOGRAPHIC APPARATUS PROVIDED WITH SUCH A SYSTEM

FIELD OF THE INVENTION

The invention relates to an interferometer system having at least one measuring axis, and to a lithographic apparatus comprising such an interferometer system. This apparatus may be a stepper or a step-and-scanner.

BACKGROUND OF THE INVENTION

A measuring axis of an interferometer system is understood to mean an axis along which the position or the displacement in a given direction (X or Y) of a given point of an object is measured. This measuring axis does not need to coincide with the chief ray of the measuring beam which is used for the measurement. If the measuring beam is sent through the system twice and reflected by the object twice at substantially the same point, the measuring axis is situated between the chief ray of the measuring beam on the first passage and the chief ray of this beam on the second passage.

An interferometer system for use in a lithographic apparatus is known from, inter alia, U.S. Pat. No. 5,404,202. The lithographic apparatus is used for repetitive and reduced imaging of a mask pattern, for example the pattern of an integrated circuit (IC) on a substrate provided with a radiation-sensitive layer. Between two successive images of the mask pattern on the same substrate, this substrate and the mask are moved with respect to each other, for example parallel to the X or Y direction of an XYZ system of coordinates, while the substrate plane and the mask plane are parallel to the XY plane so as to image the mask pattern consecutively on all substrate fields, or IC areas, of the substrate.

In the manufacture of integrated circuits, the lithographic apparatus is used in combination with masking and diffusion techniques. A first mask pattern is imaged in a large number, for example, dozens of fields of a substrate. The substrate is then removed from the apparatus so as to subject it to the desired physical and/or chemical process steps. Subsequently, the substrate is introduced into the same or another similar apparatus so as to form an image of a second mask pattern in the different substrate fields, and so forth. It should then be ensured that, for the images of mask patterns on a substrate field, this field and the mask pattern should be aligned very accurately with respect to each other. To this end, a lithographic apparatus not only comprises an alignment system but also an interferometer system. In a stepping apparatus, the interferometer system is used to measure the movements and the positions of the substrate and the separate substrate fields accurately. In a step-and-scanning apparatus, not only this substrate interferometer system but also a mask interferometer system is used to check whether, during illumination of a substrate field, the substrate and the mask move synchronously with respect to the projection beam and a projection system by means of which the mask pattern is imaged on a substrate field.

Since it is desirable to provide an IC with an increasingly larger number of electronic components, which means that the details of these components should become smaller, more stringent requirements must be imposed, not only on the resolving power and the imaging quality of the projection system but also on the accuracy with which the positions of the substrate fields can be measured and thus checked. This means that the interferometer system must also become more accurate. Then, turbulences and other disturbances, particularly in the medium in which the measuring beams propagate, will start playing an important role. These turbulences and disturbances cause variations of the refractive index of the medium, which variations are interpreted as displacements by the interferometer system.

U.S. Pat. No. 5,404,222 describes an interferometer system in which the effects of the disturbances can be measured so that the position measurements can be corrected therefor. This interferometer system comprises a first laser source in the form of a HeNe laser which supplies a beam at a wavelength of 633 nm. This beam is split into a measuring beam and a reference beam which are sent to the measuring mirror and the reference mirror, respectively, and with which the position of the measuring mirror is measured in known manner. The known interferometer system further comprises a second laser source which supplies two test beams at considerably different wavelengths. These test beams both traverse the measuring path to the measuring mirror and, after reflection by this mirror, they reach a special detection system. Use is made of the fact that, for a beam, the refractive index of the medium traversed by this beam is dependent on the wavelength of this beam. When said disturbances occur, the refractive index variations for the two test beams are different, resulting in a phase difference between the two test beams. By measuring this phase difference, the effect of the disturbances on the measuring beam traversing the same medium can be measured. Since use is made of the dispersion of the medium, the wavelengths of the test beams should be considerably different for an accurate measurement of the effects. In the interferometer system described in U.S. Pat. No. 5,404,222, wavelengths of 532 nm and 266 nm have been chosen. The first test beam with a wavelength of 532 nm is supplied by a laser, and the second test beam with a wavelength of 266 nm is obtained from the first test beam by a frequency-doubling element which comprises a non-linear material and converts a part of the radiation with a wavelength of 532 nm into radiation with a wavelength of 266 nm which constitutes the second test beam. In practice, the problem occurs that the interferometer system comprises a plurality of elements which are wavelength-dependent by nature. For example, the conventional interferometer systems comprise a polarization-sensitive beam splitter and a $\lambda/4$ plate in which $\lambda$ is the wavelength used, by means of which it can be ensured that substantially no radiation loss occurs when splitting the laser beam into a measuring beam and a reference beam and when combining these beams again. It is very difficult, if not impossible, to manufacture such elements which are suitable for both the wavelength of the measuring beam and for the two wavelengths of the test beams. The same applies to multilayer reflection structures and multilayer antireflection structures which are provided on components of the interferometer system.

SUMMARY OF THE INVENTION

It is an object of the present invention to provide an interferometer system in which easily manufacturable optical elements can be used and in which the disturbance measuring device has a simple structure. This interferometer system is characterized in that the wavelength of the second laser beam is of the order of three times that of the first laser beam, and the second detection means make use of the radiation of the second laser beam reflected by the measuring mirror, and the first measuring beam.

The invention is based on the recognition that a $\lambda/4$ plate for a beam having a given wavelength behaves as a $3\lambda/4$ plate for a beam having a wavelength which is three times smaller and that the optical effect of a 3λ/4 plate is the same as that of a λ/4 plate. The same applies to a polarization-sensitive beam splitter. The elements of the interferometer system only need to be optimized for the largest wavelength; for the smallest wavelength, the elements are then optimized automatically. At this wavelength ratio, the polarization elements as well as the antireflective multilayer structures on optical components of the interferometer system can be easily manufactured. The novel interferometer system is simpler than that described in U.S. Pat. No. 5,404,222 because it does not comprise a HeNe laser and the associated beams.

A first embodiment of the novel interferometer system is further characterized in that the second laser beam constitutes a test beam, and the phase difference between the first measuring beam reflected by the measuring mirror and the test beam is indicative of said disturbances.

This embodiment is distinguished from the interferometer system in accordance with U.S. Pat. No. 5,404,222 in that one of the two test beams is also used for the actual position measurement. In this embodiment, the same procedure as described in U.S. Pat. No. 5,404,222 for the two test beams can be followed for detecting the disturbances in the medium by means of the first measuring beam and the test beam. The subject matter of U.S. Pat. No. 5,404,222 relating to this embodiment is herein incorporated by reference.

A preferred embodiment of the novel interferometer system is characterized in that the second laser beam is split into a second measuring beam and a second reference beam which traverse the same measuring path and reference path, respectively, as the first measuring beam and first reference beam, respectively.

In this system, a first position measurement by means of the first measuring beam and the first reference beam and a first detector, and a second position measurement by means of the second measuring beam and the second reference beam and a second detector are performed. Now, the difference between the position measuring signals coming from the two detectors is indicative of occurring disturbances, notably turbulences, in the medium which is traversed by the beams.

The laser source for supplying the measuring beam and the test beam may consist of a first laser which supplies radiation at one of the two wavelengths, and a second laser which supplies radiation at the other wavelength. It should be ensured that the two wavelengths remain correctly matched with each other.

However, the novel interferometer system is preferably further characterized in that the laser source comprises the combination of a single, continuous laser and a wavelength converter.

The beams supplied by this laser source then automatically retain the desired wavelength ratio.

A preferred embodiment of the interferometer system is further characterized in that the second laser beam has a wavelength of 1064 nm and the first laser beam has a wavelength of approximately 355 nm.

The radiation at the smaller wavelength may be obtained, for example by three-fold frequency doubling of the radiation having the larger wavelength. In the embodiment in which only the first laser beam is used for the position measurement, the resolving power of the interferometer system can be maximized by choosing the smaller wavelength for this beam.

The λ/4 plate for the larger wavelength is readily suitable as a 3λ/4 plate for the smaller wavelength. Also the optical interference filter of the polarization-sensitive beam splitter shows the desired interference effect, both at the larger wavelength and at the smaller wavelength. However, to increase the bandwidth of this interference filter for the smaller wavelength, this filter is characterized in that it has a first layer packet which is suitable as a quarter-λ element for the second wavelength, and a second layer packet which is suitable as a broadband quarter-λ element for the first wavelength.

As already noted, the outer surfaces of the elements are provided with an antireflection structure in the form of an optical interference filter in the interferometer system. At the ratio between the larger and smaller wavelengths chosen in accordance with the invention, such a filter can be optimized for the two wavelengths. A preferred embodiment of such a filter is characterized in that it comprises four layers alternately having a higher and a lower refractive index, the third layer having the same refractive index as the first layer and a thickness which is equal to half that of the first layer, and the fourth layer having the same refractive index as the second layer and a thickness which is equal to half that of the second layer.

The invention may be used in any interferometer system with one or more measuring axes with which very accurate measurements must be performed and in which variations of the ambient parameters, notably turbulences in the medium, may affect the measurement. An interferometer system with three measuring axes, namely an X measuring axis and an Y measuring axis for measuring the displacements along the X axis and the Y axis, and a second X measuring axis or Y measuring axis with which, in combination with the other X measuring axis or Y measuring axis, the rotation of the substrate about the Z axis can be measured has been used for quite some time in lithographic apparatuses for measuring the positions and displacements of the substrate. Since notably the possibly occurring turbulences in the medium may be very local and not the same for all measuring axes, a three-axis interferometer system in which the invention is used is preferably characterized in that two laser beams having wavelengths which are a factor of three different and separate first and second detection means are available for each measuring axis.

The turbulences and other disturbances are then measured for each measuring axis separately, and very accurate measurements can be performed.

A particular interferometer system is described in EP-A 0 498 499. This interferometer system has at least five measuring axes. With this system, not only the displacements of the substrate, or another object, along the X axis and the Y axis and the rotation about the Z axis can be measured, but also a tilt $\phi_x$ about the X axis and a tilt $\phi_y$ about the Y axis. When this interferometer system is used, each field of the substrate can be positioned very accurately with respect to the mask pattern without a separate alignment having to be performed for each field. Consequently, the time required for illuminating an entire substrate can be decreased considerably. Also for novel generations of even more refined lithographic apparatuses, in which even more stringent alignment and positioning requirements are imposed, an interferometer system with five measuring axes may provide considerable advantages. If the invention is used in such an interferometer system, it is again characterized in that two laser beams having wavelengths which are a factor of three different and separate first and second detection means are available for each measuring axis.

The invention also relates to a stepping lithographic projection apparatus for repetitively imaging a mask pattern on a substrate, which apparatus comprises an illumination unit for supplying a projection beam, a mask table with a mask holder, a substrate table with a substrate holder, a projection system arranged in the path of the projection beam, and an optical measuring system for measuring positions and orientations of the substrate, This apparatus is characterized in that the measuring system is an interferometer system as described hereinbefore.

By using the interferometer system in the apparatus, the accuracy of this apparatus is enhanced considerably.

The invention also relates to a step-and-scanning lithographic projection apparatus, wherein the mask pattern is imaged on each substrate field by way of scanning and wherein a measuring system is present for measuring the positions of the mask. This apparatus is characterized in that this measuring system is an interferometer system as described hereinbefore.

In a step-and-scanning lithographic apparatus, an differential interferometer system, with which displacements of the mask with respect to the substrate are measured directly and optically, may also be used instead of separate interferometer systems for the substrate and the mask, as described in PCT patent application WO 97/33205. If the invention is used in a differential interferometer system, it is characterized in that two laser beams having wavelengths which are a factor of three different and separate first and second detection means are available for each measuring axis.

These and other aspects of the invention are apparent from and will be elucidated with reference to the embodiments described hereinafter.

DETAILED DESCRIPTION

Figure 1:
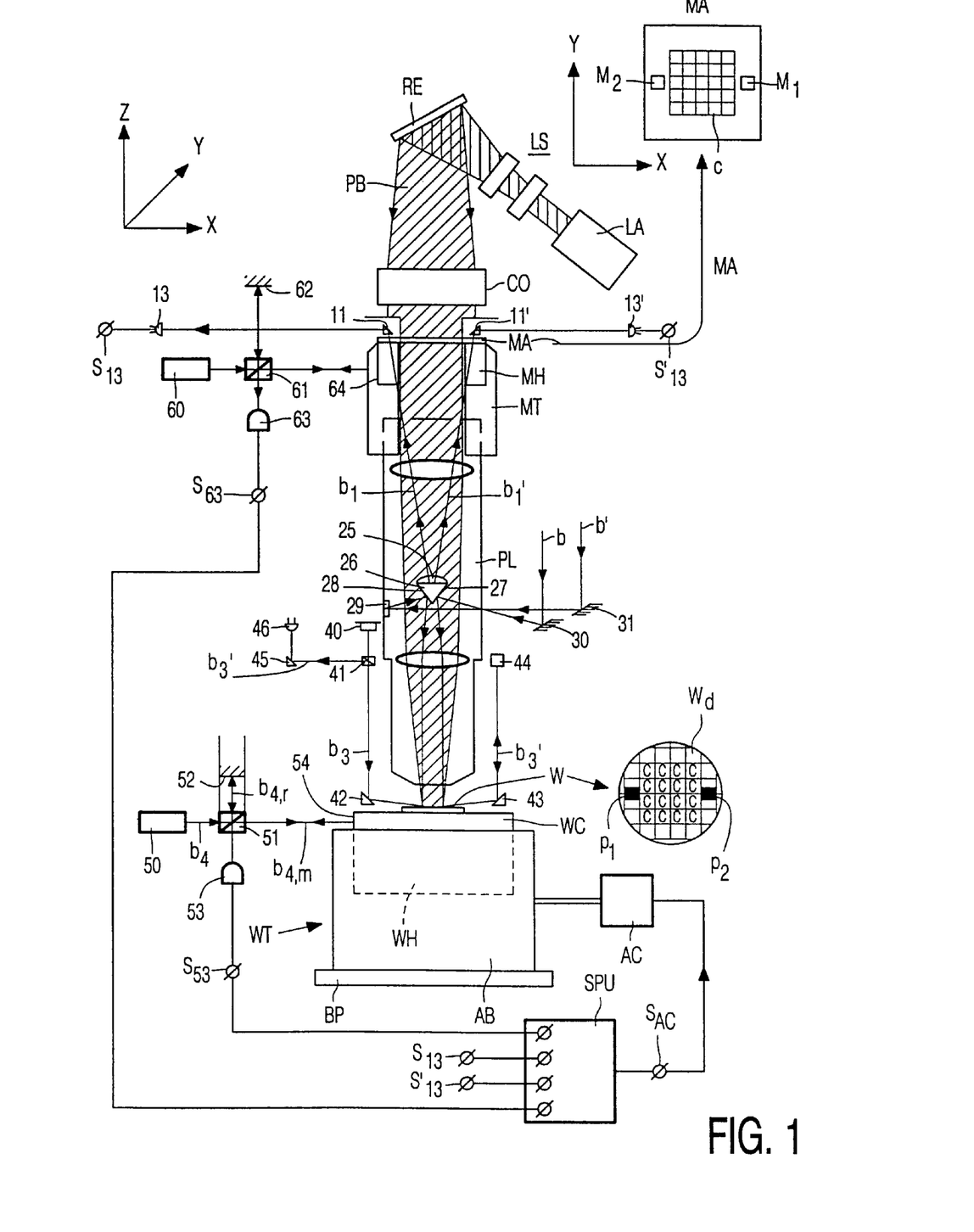
FIG. 1 shows diagrammatically an embodiment of a photolithographic projection apparatus for repetitively imaging a mask pattern on a substrate.

FIG. 1 shows diagrammatically the optical elements of an embodiment of a photolithographic apparatus for repetitively imaging a mask pattern on a substrate. The main component of this apparatus is a projection column accommodating a projection lens system PL. A mask holder MH for a mask MA, in which the mask pattern C to be imaged is provided, is arranged above this system. The mask holder is present in a mask table MT. A substrate table WT is arranged below the projection lens system PL. This table accommodates a substrate holder WH for a substrate W which is provided with a photosensitive layer and on which the mask pattern must be imaged a number of times, each time in a different IC area Wd. The substrate table is movable in the X and Y directions so that, after imaging of the mask pattern on an IC area, a subsequent IC area can be positioned underneath the mask pattern.

The apparatus further has an illumination system which comprises a radiation source LA, for example, a Krypton-Fluoride Excimer laser or a mercury lamp, a lens system LS a reflector RE and a condensor lens CO. The projection beam PB supplied by the illumination system illuminates the mask pattern C. This pattern is imaged by the projection lens system PL on an IC area of the substrate W. The illumination system may be alternatively implemented as described in EP-A 0 658 810. The projection lens system has a magnification of, for example, $M=¼$, a numerical aperture $NA=0.6$ and a diffraction-limited image field having a diameter of 22 mm.

The apparatus further comprises a plurality of measuring systems, namely a system for aligning the mask MA with respect to the substrate W in the XY plane, an interferometer system for determining the X and Y positions and the orientation of the substrate holder and hence of the substrate, and a focus error detection system for determining a deviation between the focal or image plane of the projection lens system PL and the surface of the photosensitive layer on the substrate W. These measuring systems are parts of servo-systems which comprise electronic signal-processing and control circuits and drivers, or actuators, with which the position and orientation of the substrate and the focusing can be corrected by means of the signals supplied by the measuring systems.

The alignment system uses two alignment marks $M_1$ and $M_2$ in the mask MA, indicated in the top right corner of FIG. 1. These marks preferably consist of diffraction gratings, but they may be alternatively formed by other marks, such as squares or strips which are optically different from their surroundings. The alignment marks are preferably two-dimensional, i.e. they extend in two mutually perpendicular directions, the X and Y directions in FIG. 1. The substrate W has at least two alignment marks, preferably also two-dimensional diffraction gratings, two of which, $P_1$ and $P_2$, are shown in FIG. 1. The marks $P_1$ and $P_2$ are located outside the area of the substrate W where the images of the pattern C must be formed. The grating marks $P_1$ and $P_2$ are preferably phase gratings and the grating marks $M_1$ and $M_2$ are preferably amplitude gratings.

FIG. 1 shows a special embodiment of an alignment system, namely a double alignment system in which two alignment beams b and b' are used for aligning the substrate alignment mark $P_2$ on the mask alignment mark $M_2$, and the substrate alignment mark $P_1$ on the mask alignment mark $M_1$, respectively. The beam b is reflected by a reflecting element 30, for example, a mirror to a reflecting surface 27 of a prism 26. The surface 27 reflects the beam b to the substrate alignment mark $P_2$ which passes a part of the radiation as beam $b_1$ to the associated mask alignment mark $M_2$ where an image of the mark $P_2$ is formed. A reflecting element 11, for example, a prism is arranged above the mark $M_2$, which prism directs the radiation passed by the mark $M_2$ towards a radiation-sensitive detector 13. The second alignment beam b' is reflected by a mirror 31 to a reflector 29 in the projection lens system PL. The reflector 29 passes the beam b' to a second reflecting surface 28 of the prism 26, which surface directs the beam b' onto the substrate alignment mark $P_1$. This mark reflects a part of the radiation of the beam b' as beam $b_1$' to the mask alignment mark $M_1$ where an image of the mark $P_1$ is formed. The radiation of the beam $b_1$, passing through the mark $M_1$ is directed towards a radiation-sensitive detector 13' by a reflector 11'. The operation of the double alignment system is described in U.S. Pat. No. 4,778,275, to which reference is made for further details of this system.

The embodiment of the alignment system according to FIG. 1 is particularly suitable for an apparatus in which the projection lens system PL is designed for a projection beam PB having a short wavelength, for example, 248 nm, whereas the alignment beam has a considerably longer wavelength, for example, 633 nm. In fact, this system incorporates an extra lens, or correction lens, 25 in the projection column. This lens ensures that the substrate alignment marks are imaged in the plane of the mask alignment marks and with the correct magnification in spite of the fact that the projection lens system is not optimized for the wavelength of the alignment beam. The correction lens is arranged at such a height in the projection column that, on the one hand, the sub-beams of different diffraction orders of the alignment beam, which sub-beams are generated by a substrate alignment mark, are sufficiently separated in the plane of the correction lens so as to be able to influence these sub-beams separately, and, on the other hand, the correction lens has a negligible influence on the projection beam and the image formed therewith of the mask pattern C. The correction lens 25 is preferably arranged in the Fourier plane of the projection lens system. If the correction lens is arranged in a plane in which the chief rays of the alignment beams b and $b_1$, intersect each other, as is shown in FIG. 1, this lens can be used for correcting the two alignment beams. For further details about the object and operation of the correction lens 25, reference is made to U.S. Pat. No. 5,100,237.

A wedge or another deflection element, such as a diffraction element, is preferably arranged in the proximity of an alignment mark further down the path of the alignment beam(s). With such a deflection element (not shown in FIG. 1), alignment errors may be prevented, which result from unintentional phase differences within the selected alignment beam portions captured by the detector 13 or 13', which phase differences may occur if the symmetry axis of the alignment beam portions coming from a substrate alignment mark is not perpendicular to the mask plate, so that false reflections may occur within this plate. An alignment system provided with such a deflection element is described in U.S. Pat. No. 5,481,362.

In addition to the global alignment marks $P_1$ and $P_2$ shown in FIG. 1, which marks are used for aligning the total substrate with respect to the mask, referred to as global alignment, the substrate may be provided with further alignment marks, for example one mark per IC area, so as to align the relevant area with respect to the mask pattern for each IC area. The mask may have more than two alignment marks, while the further alignment marks may be used, for example, to measure the rotation of the mask about the Z axis so as to correct therefor.

The projection apparatus may further comprise a focus error detection system for determining a deviation between the focal plane of the projection lens system PL and the surface of the substrate W so that this deviation can be corrected, for example, by controlling the height of the substrate surface with Z actuators which are present in the substrate table. The focus error detection system may be constituted by the elements 40, 41, 42, 43, 44, 45 and 46 which are arranged in a holder (not shown) which is fixedly connected to the projection lens system, or are arranged in a metrology frame in which also the projection system is arranged. Element 40 is a radiation source, for example a diode laser emitting a focusing beam $b_3$. This beam is directed at a very small angle onto the substrate by a reflecting prism 42. The beam reflected by this surface is directed towards a retroreflector 44 by the prism 43. The element 44 reflects the beam in itself so that this beam ($b'_3$) once more traverses the same path via reflections on the prism 43, the substrate surface and the prism 42. The beam $b'_3$ reaches the radiation-sensitive detection system 46 via a partially reflecting element 41 and a reflecting element 45. This system comprises, for example, a position-dependent detector or two separate detectors. The position of the radiation spot formed by the beam $b'_3$ on this system is dependent on the extent by which the focal plane of the projection lens system coincides with the surface of the substrate W. Reference is made to U.S. Pat. No. 4,356,392 for an extensive description of the focus error detection system.

For accurately determining the X and Y positions of the substrate table WT, known projection apparatuses comprise a multi-axis interferometer system. U.S. Pat. No. 4,251,160 describes a two-axis system and U.S. Pat. No. 4,737,283 describes a three-axis system. In FIG. 1, such an interferometer system is diagrammatically represented by the elements 50, 51, 52 and 53, the Figure showing only one measuring axis, the X axis. The beam $b_4$ emitted by a radiation source 50, for example a laser, is split into a measuring beam $b_{4,m}$ and a reference beam $b_{4,r}$ by a beam splitter 51. The measuring beam reaches a reflecting side face 54 of the substrate holder WH and the measuring beam reflected by this side face is combined by the beam splitter with the reference beam reflected by a stationary reflector 52, for example, a "corner cube" reflector. The intensity of the combined beam can be measured with a detector 53 and the displacement, in this case in the X direction, of the substrate holder WH can be derived from the output signal of this detector, and also an instantaneous position of this holder can be established.

As is diagrammatically shown in FIG. 1, the interferometer signals, represented by one signal $S_{53}$ for the sake of simplicity, and the signals $S_{13}$ and $S_{13}$, of the alignment system are applied to a signal-processing unit SPU, for example a microcomputer, which processes said signals to control signals $S_{AC}$ for an actuator AC with which the substrate holder is moved in the XY plane via the substrate table WT.

With an interferometer system, which does not only comprise the X measuring axis shown in FIG. 1 but also a Y measuring axis and possibly a third measuring axis, the positions of, and the mutual distances between, the alignment marks $P_1$, $P_2$ and $M_1$, $M_2$ in a system of co-ordinates defined by the stationary interferometer system can be laid down during the initial, or global, alignment of the mask with respect to the substrate. This interferometer system is also used to enable the substrate table to step very accurately, i.e. to move it through predetermined distances and directions. Such a step is performed to position a subsequent IC field under the mask pattern and the projection lens system after the mask pattern has been imaged with one (or more) flash(es) in a first IC area or field, so that the mask pattern can also be imaged in this field. These step and imaging operations continue until all IC fields have been provided with a mask pattern image. A lithographic apparatus operating in this manner is referred to as stepper.

Due to the demand for more electronic components per surface unit of an IC field, on the one hand, and larger IC fields, on the other hand, increasingly stricter requirements are imposed on the resolving power and the image field of the projection lens system. To alleviate these technologically contradictory requirements, it has already been proposed to use a step-and-scanner. In such an apparatus, the same stepping movements as in a stepper are performed, but only a small portion of the mask pattern is imaged every time on a corresponding sub-field of the IC field when imaging the mask pattern on an IC field. By imaging successive parts of the mask pattern on successive sub-fields of the IC area, an image of the entire mask pattern on an IC field is obtained. To this end, the mask pattern is illuminated with a projection beam which forms a small, for example rectangular or arcuate, illumination spot at the location of the mask pattern, and the substrate table is moved in a given direction, the scan direction, with respect to the projection lens system and the projection beam, and the mask table is moved in the same or the opposite direction, while the rate of the substrate table is M times that of the mask table. M is the magnification with which the mask pattern is imaged. It should be ensured that the mask and the substrate have the correct mutual position at any moment, which can be realized by means of a very accurate synchronization of the movements of the mask and the substrate, i.e. the rate $V_{sub}$ of the substrate is always equal to M times the rate $V_{MA}$ of the mask.

To check the condition $V_{Sub}=M.V_{MA}$, the step-and-scanner should not only comprise a substrate interferometer system but also a mask interferometer system with which the movement and the position of the mask can be measured accurately. The measuring mirror of the last-mentioned system is preferably secured to the mask holder. The mask interferometer system is denoted in FIG. 1 by the elements 60, 61, 62, 63 and 64 which have the same function as the elements 50, 51, 52, 53, and 54 of the substrate interferometer system. The mask interferometer system signals, represented by one signal $S_{63}$ for the sake of simplicity in FIG. 1, are applied to the signal-processing unit SPU in which these signals are compared with the corresponding signals of the substrate interferometer system. It can then be ascertained whether the mask and the substrate have the mutually correct position and/or move synchronously.

To ascertain whether this is the case, it is sufficient that both the interferometer system for the substrate and that for the mask have three measuring axes. However, the substrate interferometer system preferably has five measuring axes. As described in EP-A 0 498 499, not only X, Y and $ø_{z,w}$ but also $ø_{x,w}$ and $ø_{y,w}$, i.e. the tilts of the substrate about the X axis and the Y axis can be measured. For the different embodiments of the interferometer units of which a five-axis interferometer system may be composed, reference is made to EP-A 0 498 499. To be able to measure the tilts about the X axis and the Y axis also for the mask, a five-axis mask interferometer system may be used. However, it is alternatively possible to combine a three-axis mask interferometer system with other sensors, such as capacitive sensors, for measuring the tilts of the mask about the X axis and the Y axis.

Figure 2:
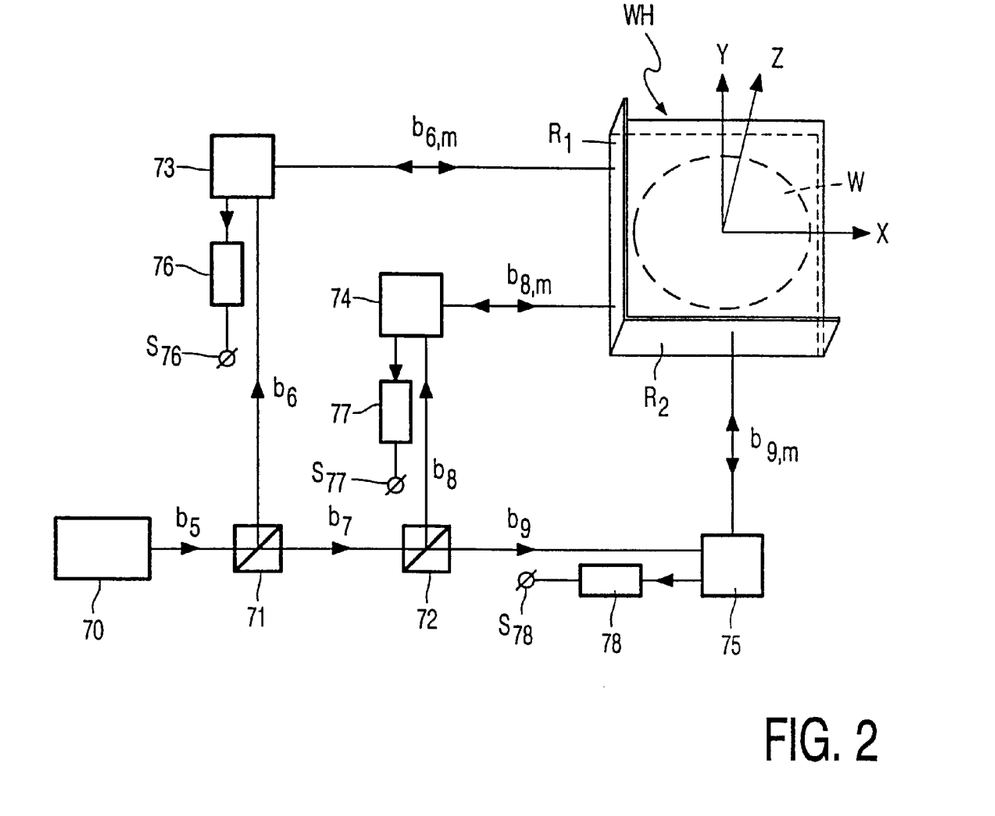
FIG. 2 shows an interferometer system with three measuring axes for use in this apparatus.

An embodiment of an interferometer system with three measuring axes with which the movements and the positions of the substrate, or the mask, along the X axis and the Y axis can be measured, as well as a rotation of the substrate, or the mask, about the Z axis is described in the article "Linear/angular displacement interferometer for wafer stage metrology" in SPIE, vol. 1088: Optical/Laser Microlithography, pp. 268–272. FIG. 2 shows the diagram of such an interferometer system, together with the substrate holder WH. The composite interferometer system comprises a laser 70, for example a Helium-Neon laser, two beam splitters 71 and 72 and three interferometer units 73, 74 and 75. A part of the beam $b_5$ from the laser is reflected by the beam splitter 71 as beam $b_6$ to the interferometer unit 73 which co-operates with the mirror $R_1$ of the substrate holder WH. The beam $b_7$ passed by the beam splitter 71 is split by the beam splitter 72 into a beam $b_8$ which is reflected to the interferometer unit 74 and into a beam $b_9$ which is passed to the interferometer unit 75. The interferometer unit 74 co-operates with the measuring mirror $R_1$, while the interferometer unit 75 co-operates with the measuring mirror $R_2$.

Figure 3:
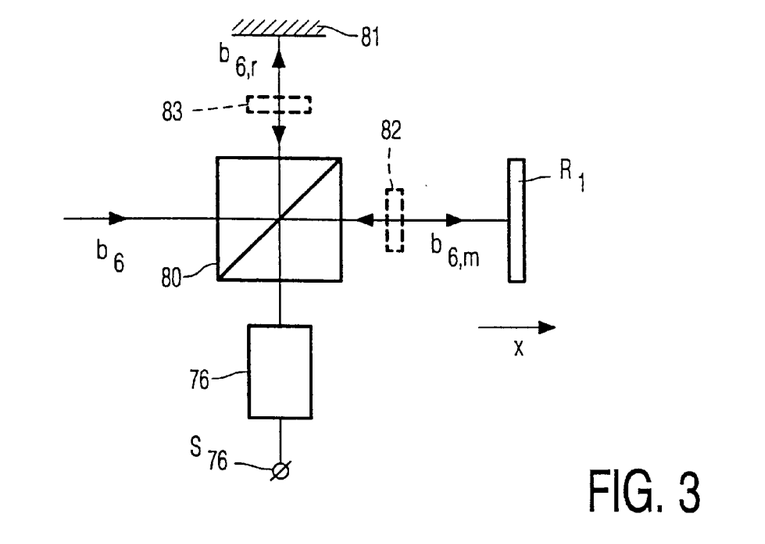
FIG. 3 shows the principle of a one-axis interferometer system.

FIG. 3 illustrates the principle of the interferometer unit 73. This unit comprises a beam splitter 80, for example, a partially transparent mirror which splits the incoming beam $b_6$ into a measuring beam $b_{6,m}$ and a reference beam $b_{6,r}$. The measuring beam is passed to the substrate holder mirror $R_1$ which reflects this beam to the beam splitter 80 which in its turn reflects a part of the beam $b_{6,m}$ to a detector 76. The reference beam $b_{6,r}$ reflected by the beam splitter 80 is reflected to the beam splitter 80 by a fixedly arranged reference mirror 81 which passes a part of this beam to the detector 76. When the substrate holder mirror is moved in the X direction, constructive and destructive interferences alternately occur between the beams $b_{6,m}$ and $b_{6,r}$ incident on the detector 76, so that the output signal of this detector passes from a maximum value to a minimum value, and conversely, whenever the substrate holder is displaced over a distance of $\lambda/4$, in which $\lambda$ is the wavelength of the beam $b_6$. The measured number of maxima and minima of the detector signal $S_{76}$ is a measure of the displacement of the substrate holder in the X direction. Movements of the mirror $R_1$ which are much smaller than $\lambda/4$, for example, up to $\lambda/128$ or even $\lambda/512$ can be measured by making use of electronic interpolation methods known in the interferometer technique.

The interferometer units 74 and 75 have the same construction and operate in the same way as the interferometer unit 73. The movement of the mask holder in the Y direction is measured by means of the interferometer unit 75 and the associated detector 78. A second measurement in the X direction is performed with the interferometer unit 74 and the associated detector 78. The rotation of the holder about the Z axis is computed from the signals $S_{76}$ and $S_{77}$. This rotation is given by:

$$\varphi_z = \frac{S_{76} - S_{77}}{d}$$

in which d is the distance between the points where the chief rays of the measuring beams $b_{6,m}$ and $b_{6,r}$ impinge upon the mirror $R_1$.

It is to be noted that FIG. 3 only shows the principle of an interferometer unit. In practice, a polarization-sensitive beam splitter 80 and a number of $\lambda/4$ plates, represented by the elements 82 and 83 in FIG. 3, will be used for beam splitting and combination. Then the radiation loss is minimal, which is particularly important if only one laser 70 is to be used for the different interferometer units. A Zeeman laser will preferably be used as a radiation source which emits a beam with two mutually perpendicularly polarized components and different frequencies. The beam components then constitute the measuring beam and the reference beam, and the measurement is then based on a phase measurement. Furthermore, retroreflectors as described in said article in SPIE, vol. 1088, Optical/Laser Microlithography II, pp. 268–272 may be incorporated in the interferometer units, which retroreflectors reflect a measuring beam after reflection by a measuring mirror to this measuring mirror again, so that the measurement performed with the relevant interferometer is independent of a tilt of the relevant measuring mirror.

To be able to perform the X, Y and $\phi_z$ measurement on the substrate with the desired accuracy by means of a three-axis interferometer system, the following two conditions should be fulfilled:

1. the chief rays of the interferometer beams must be located in a plane which coincides with the surface of the substrate.
2. during the displacements along the X axis and the Y axis and the possible rotation about the Z axis, the substrate holder must be fixed in the other degrees of freedom $\phi_{x,w}$ and $\phi_{y,w}$.

As described in EP-A 0 498 499, these conditions, which can hardly or not easily be fulfilled in practice, can be circumvented by making use of a five-axis interferometer system with which more movements of the substrate can be measured, so that this provides the possibility of measuring the X and Y movements more accurately.

Figure 4:
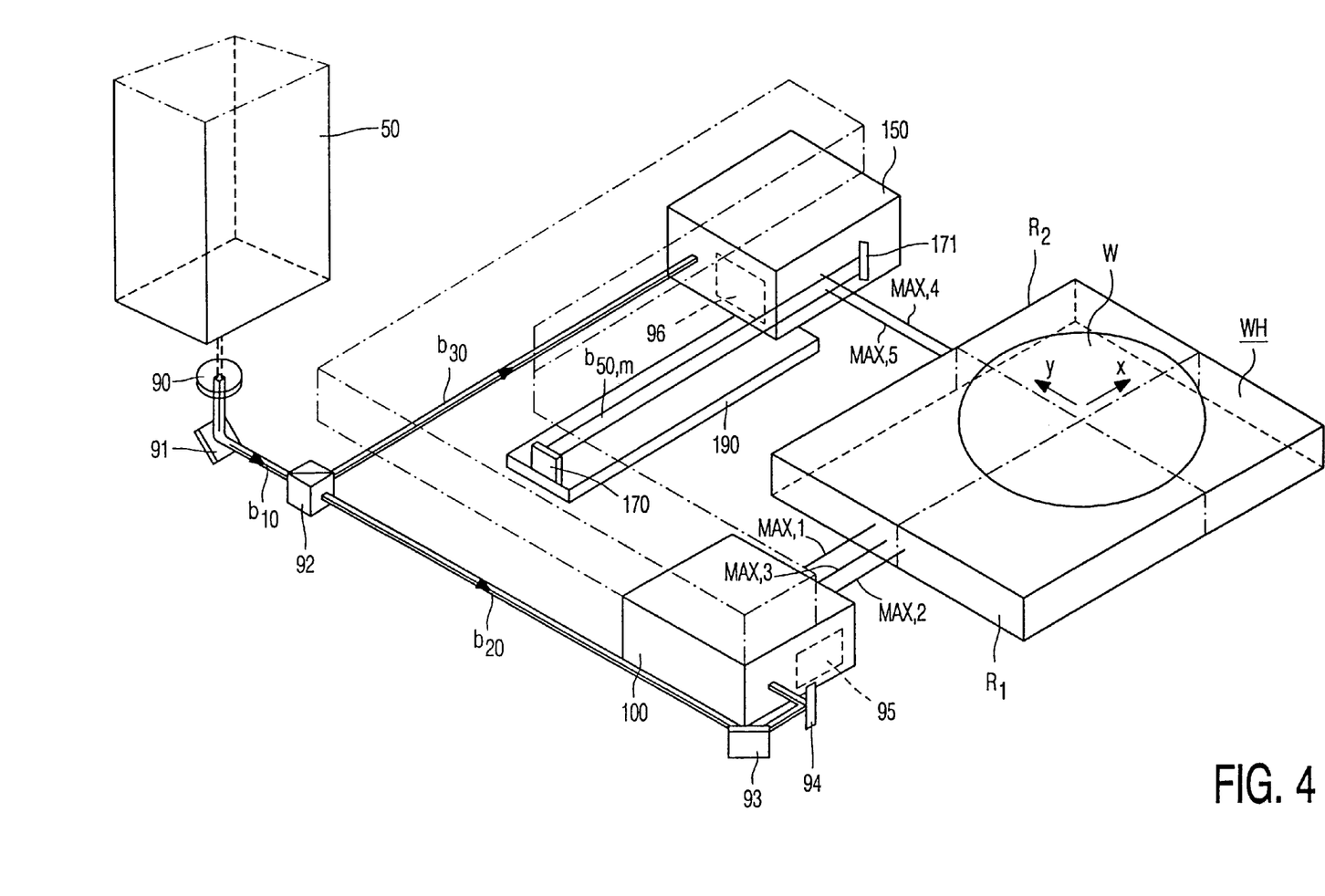
FIG. 4 shows an interferometer system with five measuring axes for use in this apparatus.

FIG. 4 shows the principle of such a system for measuring the five degrees of freedom: X, Y, $\phi_{x,w}$, $\phi_{y,w}$ and $\phi_{z,w}$, in which the substrate holder is provided with an integrated mirror block consisting of two mirrors $R_1$ and $R_2$. The system comprises, for example, two interferometer units 100 and 150 to which the beams $b_{20}$ and $b_{30}$ are supplied. These beams are emitted by a laser 50, for example a Helium-Neon laser, either or not of the Zeeman type. The beam $b_{10}$ coming from this laser first passes a beam-widening optical system diagrammatically shown by means of the lens 90 and is subsequently split into the two beams $b_{20}$ and $b_{30}$ by the beam splitter 92. The elements 91, 93 and 94 are reflectors which ensure that the beams are deflected in such a way that they are incident on the interferometer units 100 and 150 at the correct angles. The interferometer unit 100 may be implemented in such a way that it emits three measuring beams along the measuring axes MAX,1, MAX,2 and MAX,3 towards the measuring mirror $R_1$ and receives these beams from this mirror. With these beams, the displacement in the X direction, supplied from the signal by one of the axes MAX,1 and MAX,2, the tilt about the Y axis, from the difference of the signal supplied by the measuring axis MAX,3 and the signal of one of the measuring axes MAX,1 and MAX,2, and the rotation about the Z axis, from the difference of the signals of the measuring axes MAX,1 and MAX,2, of the substrate holder can be measured. The second interferometer unit emits two measuring beams along the measuring axes MAX,4 and MAX,5 to, and receives these beams from the measuring mirror $R_2$. With these beams, the displacement in the Y direction can be measured from the signal of one of the measuring axes MAX,4 and MAX,5, and the tilt $\phi_x$ about the X axis can be measured from the difference of the signals of these measuring axes, of the substrate holder and hence of the substrate. The measuring axes MAX,5 and MAX,3 are displaced with respect to the measuring axis MAX,4 and the measuring axes MAX,1 and MAX,2 in the Z direction, whereas the measuring axis MAX,1 with respect to the measuring axis MAX,2 is displaced in the Y direction. It has further been ensured that the measuring axes MAX,1, MAX,2 and MAX,4 are positioned as closely as possible to the surface of the substrate holder so that the Abbe errors are minimal and the measured X and Y displacements are optimally equal to the actual displacements of the substrate.

The interferometer units 100 and 150 may be implemented in various ways. For details, reference is made to EP-A 0 489 499 which is herein incorporated by reference.

The substrate interferometer system may also have at least one Z measuring axis which co-operates with a Z measuring mirror which is rigidly secured to the substrate holder. The Z position of the substrate can thereby also be measured with the interferometer system. This Z measurement may serve as a supplement to, or as a substitute for, the above-described Z measurement by means of the focus error detection system or the focus-and-level detection system.

The Z measuring axis of the interferometer system may be the measuring axis of a separate interferometer unit. However, the Z measuring axis is preferably an extra measuring axis of an interferometer unit which is already present, for example the interferometer unit 100 as is shown diagrammatically in a front elevational view in FIG. 5. In this embodiment, one side face 159 of the substrate holder WH is provided with a beveled and reflective portion 160. This portion constitutes a Z measuring mirror $R_3$. The reflective straight portion 161 of the side face has the same function as the straight mirror $R_1$ in FIG. 4. The interferometer unit 100 does not only comprise the measuring axes MAX,2 and MAX,3 but also a Z measuring axis MAX,7 which is positioned as closely as possible to the upper face of the substrate holder. The measuring mirror $R_3$ reflects the measuring beam of the measuring axis MAX,7 to a further reflector, the Z reflector, 164 which is arranged on a plate 163 which is rigidly secured to the holder LH of the projection system and may form part of a larger metrology frame. The Z reflector reflects the measuring beam to the measuring mirror $R_3$ which in its turn reflects the measuring beam to the interferometer unit 100. This unit accommodates a separate detector for the Z measuring beam, whose output signal is processed together with other signals to form a Z measuring signal.

Figure 5:
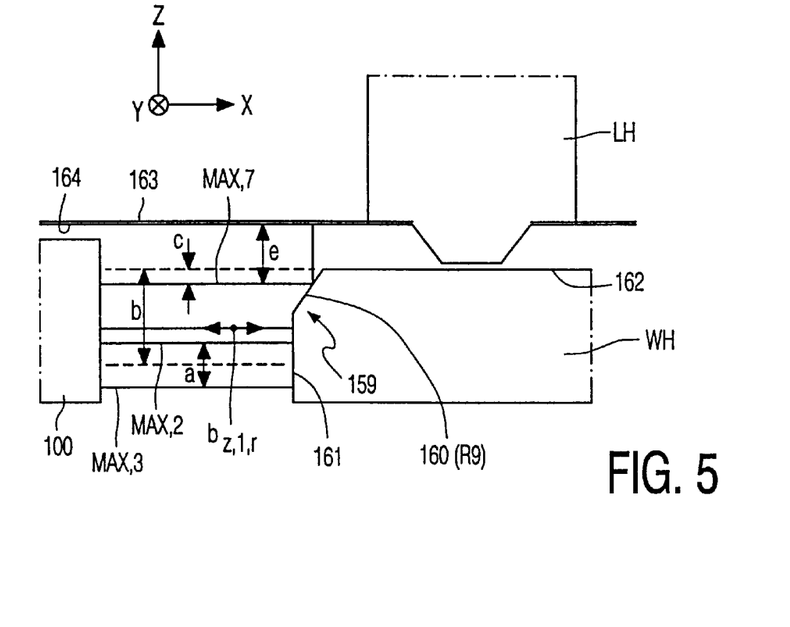
FIG. 5 shows an embodiment of a lithographic apparatus in which a height measurement is performed with the aid of an interferometer system.

The Z measuring mirror 160 ($R_3$) in FIG. 5 is arranged at an angle of 45° to the XY plane, the plane in which the X and Y measuring beams propagate. In principle, the Z measuring mirror may also extend at a different acute angle to the XY plane. However, the angle of 45° is preferred because the Z measuring beam traverses the same path to and from the Z reflector 164 and the Z measuring mirror may then have a minimal width.

In this embodiment of the interferometer system, in which the Z measuring beam impinges upon the Z measuring mirror at a position which is proximate to the upper face of the substrate holder, and hence proximate to the substrate, possible tilts of the substrate have a negligible influence on the measured Z position of the substrate.

Associated with the Z measuring beam is a reference beam which, after having been reflected by a reference mirror, is combined on the Z detector with the measuring beam reflected by the Z measuring mirror 160 and Z reflector 163. This reference mirror may be a stationary mirror within the interferometer unit 100. The signal supplied by the Z detector then does not comprise pure Z position information, but the Z position information is mixed with X position information in that signal. For obtaining a pure Z position signal, the X position information must be removed from the detector signal, hence subtracted from this signal; in other words, an electronic differentiation must be used.

Instead of a separate and stationary Z reference mirror, the X measuring mirror 161 is preferably used as a reference mirror for the Z measurement, as is shown in FIG. 5. The reference beam $b_{z,r}$ reflected by this mirror then does not comprise X position information so that the combination on the Z detector of this reference beam with the Z measuring beam results in the output signal of this detector being a pure Z position signal. Thus, an optical differentiation is performed which, as compared with an electronic differentiation, has the advantage that it cannot be limited by the processing speed of electronic circuits. The optical differentiation, hence the use of an X or Y measuring mirror as a reference mirror for the Z measurement, can also be used in the embodiments still to be described.

Various embodiments of an interferometer system with a Z measuring axis are described in the previously filed EP patent application, filing number 97203771.7 (PHQ 97.010), whose subject matter is herein incorporated by reference.

In a step-and-scanning lithographic apparatus, not only a substrate field to be illuminated must be positioned accurately with respect to the mask pattern but it should also be checked whether the substrate and the mask move synchronously during imaging of the mask pattern on the relevant substrate field, taking the magnification of the projection system into account. This check can be realized by means of the mask interferometer system diagrammatically shown in FIG. 1 by way of the elements 60, 61, 62 and 63. This interferometer system co-operates with a measuring mirror 64 which is arranged on a face of the mask holder MH. The signal $S_{63}$ of the mask interferometer system, which signal is indicative of the displacement of the mask in the scanning direction, i.e. the X direction in this embodiment, is applied together with the signal $S_{53}$ of the substrate interferometer system to an electronic processing circuit, for example the processor SPU in which these signals are subtracted from each other and processed to control signals for the X actuators of the tables.

At high table speeds, which are desired to minimize the illumination time for each substrate, the interferometer signals $S_{53}$ and $S_{63}$ have a high frequency or bitrate. When these signals are compared, the rate at which the electronic circuits can process these signals may be a restrictive factor. The time delay, i.e. the time elapsing between the instant when a measurement is performed and the instant when the measured result becomes available will then start playing an important role. In a closed servoloop system comprising the measuring systems and the actuators for the tables, delay time differences in the electronic signal processing may lead to an unwanted offset between the mask table and the substrate table. Moreover, the maximum table speed is then limited.

Figure 6:
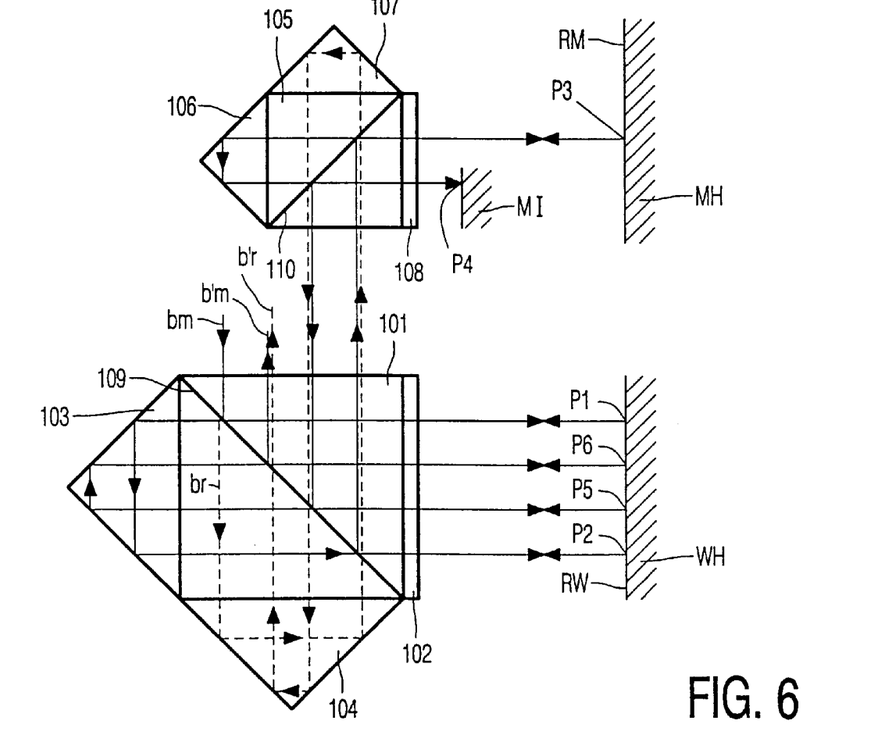
FIG. 6 shows the circuit diagram of a differential interferometer system for a step-and-scanning lithographic apparatus.

These problems can be prevented by performing an optical differentiation and using a differential interferometer when checking the synchronous movement of the mask and the substrate. FIG. 6 shows the principle of a differential interferometer for a lithographic apparatus in which the mask pattern is imaged in a four times reduced size.

This Figure shows only those components of the lithographic apparatus with which the differential interferometer system co-operates, namely the mask holder MH on which a measuring mirror RM is arranged, and the substrate holder WH on which the measuring mirror RW is arranged. The measuring beam $b_m$ coming from a laser (not shown) and the reference beam $b_r$ are shown by way of solid and broken lines, respectively. These beams are, for example the two mutually perpendicularly polarized components at different frequencies of a radiation beam supplied by a Zeeman laser so that the measurement is based on a phase measurement. The direction of the measuring beam and the reference beam is indicated by way of arrows.

At the location of the substrate holder, the embodiment of FIG. 6 comprises a polarization-sensitive beam splitter 101, a λ/4 plate 102 and two retroreflectors 103 and 104. A polarization-sensitive beam splitter 105, a λ/4 plate 108 and two retroreflectors 106 and 107 are also arranged at the location of the mask. Moreover, a stationary reflector MI is arranged at that location. The beam splitters 101 and 105 have polarization-sensitive interfaces 109 and 110 which pass a first component with a first direction of polarization of the beam coming from the laser, and reflect a second component of this beam with a second direction of polarization perpendicular to the first direction of polarization, or conversely. In the embodiment shown, the passed component is the reference beam $b_r$ and the reflected component is the measuring beam $b_m$. The λ/4 plates 102 and 108 whose directions of polarization extend at an angle of 45° to those of the beam components ensure that the direction of polarization of a beam component is rotated through 90° if this beam component passes through such a plate twice.

The measuring beam $b_m$ which is passed by the interface 109 passes the λ/4 plate 102 and impinges upon the mirror RW at the position P1. The reflected beam passes the plate 102 a second time, so that the direction of polarization is rotated through 90° with respect to the original direction of polarization, and is then passed to the retroreflector 103 by the interface 109. Via reflections on the oblique sides of this reflector, the measuring beam again enters the beam splitter 101 and is then passed by this beam splitter so as to be incident on the mirror RW a second time at the position P2. The measuring beam coming from the position P2 is reflected by the interface 109 to the interface 110 of the beam splitter 105 which is present in the proximity of the mask holder. The interface 110 reflects the measuring beam via the λ/4 plate 108 to the position P3 on the mask holder mirror RM. The measuring beam reflected by this mirror passes the λ/4 plate 108 a second time, at which its direction of polarization is rotated through 90° again, and is then passed to the retroreflector 106 by the interface 110. Via reflections on the oblique sides of this reflector and passage through the interface 110 and the λ/4 plate 108, the measuring beam reaches the stationary reflector MI at the position P4. After reflection by this reflector, the measuring beam again traverses the λ/4 plate 108 so that its direction of polarization is rotated through 90° again and is reflected by the interface 110 to the interface 109. Subsequently, the measuring beam is reflected to the substrate mirror RW again so as to be consecutively incident at the positions P5 and P6 and reflected in an analogous manner as described for the positions P1 and P2. After the measuring beam has been reflected at the position P6, it is reflected to a detector (not shown) by the interface 109.

The reference beam $b_r'$ passed by the interface 109 also traverses the entire system but reaches none of the mirrors RW, RM and MI. This beam is only reflected by the side faces of the retroreflectors 104 and 107 and is always passed by the interfaces 109 and 110 of the beam splitters 101 and 105. The mutually perpendicularly polarized beams $b'_m$ and $b'_r$ coming from the system pass an analyzer on their way to a detector (not shown). This analyzer, whose direction of polarization extends an angle of 45° to the direction of polarization of the beams, passes the components having the corresponding direction of polarization of the two beams, which two components may interfere with each other. The phase difference between these beam components is dependent on the mutual position of the mirrors RM and RW, hence of the extent to which these mirrors, and hence the mask and the substrate, move synchronously, taking the magnification M into account with which the mask pattern is imaged on the substrate by the projection system (not shown) present between the mask pattern and the substrate. In the embodiment shown in FIG. 6, in which the measuring beam is reflected four times by the substrate mirror and once by the mask mirror, the magnification M is ¼.

For further details of the differential interferometer system for a step-and-scanner, reference is made to PCT patent application WO 97/33205 in which various embodiments have been described.

In all of the above-mentioned interferometer systems, the problem occurs that, at the desired accuracy, or resolving power, of the system, variations of the refractive index of the medium traversed by the interferometer beams may affect the measurements. These variations are caused by variations of the ambient parameters such as temperature, air pressure and humidity. Also turbulences in the medium cause variations of this refractive index. If these variations proceed relatively slowly and are the same for the medium of all beams, these variations can be measured with suitable measuring instruments such as a thermometer, a barometer and a hygrometer, and the interferometer signals can be corrected with the measuring signals obtained. This is a relatively cumbersome and inaccurate method. It is more advantageous to measure these variations by means of an extra measuring axis in the interferometer system as proposed in EP-A 0 498 499 for a five-axis interferometer system. A measuring beam which co-operates with an extra measuring mirror extends along this extra measuring axis. In FIG. 4, this extra mirror is denoted by the reference numeral 170 and the extra measuring beam is denoted by $b_{50,m}$. This measuring beam is preferably supplied by the interferometer unit having the smallest number of measuring axes, i.e. the unit 150 in the embodiment described, and the beam coming from this unit is reflected by a reflector 171 to the measuring mirror 170. An extra detector is then arranged in the interferometer unit to receive the measuring beam $b_{50,m}$ reflected by the mirror 170 and the associated reference beam, and to convert these beams into an electric signal.

The extra measuring beam traverses a path having a constant geometrical length. However, the optical path length, which is the product of the geometrical length and the refractive index of the traversed medium, is affected by a refractive index variation. This variation thus also affects the path length difference between the measuring beam $b_{50,m}$ and the associated reference beam. The variation of the path length difference is measured by means of said extra detector and its output signal may be used to correct the information obtained via other measuring axes for the refractive index variations.

However, the refractive index variations which result from turbulences in the medium cannot be measured sufficiently and accurately enough in this way because these turbulences are not the same throughout the medium and occur very locally. For the reference path associated with a measuring axis and having a fixed length, the problem of the turbulences may be avoided by placing the portion of the interferometer occupied by the reference path in a vacuum space. Since the measuring path of the relevant measuring axis has a variable length, it is not possible to use a vacuum space in that path.

Figure 7:
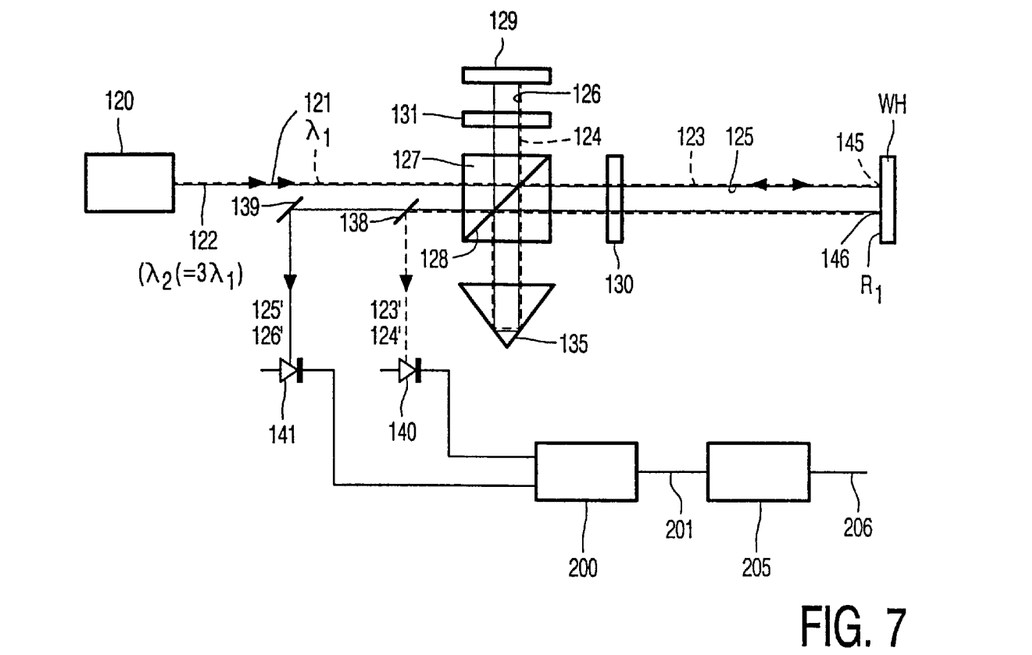
FIG. 7 shows a first embodiment of an interferometer system comprising the novel system for measuring refractive index variations.

In accordance with the present invention, these turbulences can be measured along a measuring path by making use of two measuring beams having wavelengths which are a factor of three different. FIG. 7 shows the principle and an embodiment of the novel turbulence measuring system with which of course also other changes in the medium which lead to variations of the refractive index can be measured. A key element of this system is the laser source 120 which supplies a first beam component 121 at a first wavelength $\lambda_1$ and a second beam component 122 at a second wavelength $\lambda_2$, in which $\lambda_2=3\lambda_1$. This laser source preferably comprises only a single laser whose radiation is partly converted in known manner by means of a non-linear optical element into radiation having a wavelength which is ⅓ of the original wavelength. This laser source may be constituted, for example by a YAG laser in which a three-fold frequency increase takes place, which laser then supplies the wavelengths 1064 nm and 355 nm. The system further comprises the elements known for an interferometer system such as a polarization-sensitive beam splitter 127 with an interface 128, a reference mirror 129, two $\lambda/4$ plates 130 and 131 and a retroreflector 135.

The laser beam 121 having the smallest wavelength is split by the interface 128 into a measuring beam 123 and a reference beam 124. The measuring beam 123 is passed by the interface 128 and reaches the measuring mirror at the position 145. This mirror is, for example, the measuring mirror $R_1$ which is arranged on the substrate holder WH. This mirror reflects the beam 123 to the interface 128. Since upon arrival at this interface the beam 123 has passed through the $\lambda/4$ plate 130 twice, its direction of polarization is rotated through 90° so that this measuring beam is now reflected by the interface to the retroreflector 135. Via reflections on the oblique sides of this reflector, the beam 123 is sent to the interface 128 again. This interface reflects the beam 123 to the measuring mirror $R_1$ again. After reflection, at the position 146, by this mirror, the beam 123' reaches the interface 128 again. Since the measuring beam passes through the $\lambda/4$ plate twice again on its second path to and from the measuring mirror, its direction of polarization is rotated through 90° again, so that the beam 123' is passed by the interface. This beam is then reflected to a first detector 140 by a wavelength-selective beam splitter, or optical high-pass filter, 138.

The reference beam 124 associated with the measuring beam 123 is reflected by the interface 128 to the reference mirror 129. This mirror reflects the beam to the interface 128. Upon arrival at this interface, the direction of polarization of the beam is rotated through 90° because it has meanwhile traversed the $\lambda/4$ plate 131 twice. The beam 124 is then passed by the interface to the retroreflector 135 which sends the beam 124 via reflections on its side faces back to the interface 128. This interface passes the beam to the reference mirror 129 which reflects the reference beam as beam 124' to the interface. The reference beam then again traverses the $\lambda/4$ plate 131 twice so that its direction of polarization is rotated through 90° again. As a result, the reference beam 124' is reflected by the interface and is sent together with the measuring beam 123' to the detector 140, via the beam splitter 138. The output signal of this detector comprises information about the position or displacement of the measuring mirror $R_1$.

The second laser beam 122 having the largest wavelength is also split by the interface 128 into a measuring beam 125 and a reference beam 126, which beams traverse the system in the same way as the measuring beam 123 and the reference beam 124. After passage through the system, the measuring beam 125' and the reference beam 126' are passed by the wavelength-selective beam splitter 138 to a reflector 139 which reflects the beams to a second detector 141. Also the output signal of this detector comprises information about the position or displacement of the measuring mirror $R_1$.

The output signals of the detectors 140 and 141 are applied to the inputs of a comparison circuit 200. Since the measuring beams 123 and 125 traverse the same path, likewise as the reference beams 124 and 126, the output signals of the detectors 140 and 141 should be equal to each other. If this is not the case, a refractive index variation has occurred in the medium. If this is a rapid variation, it is the result of turbulence in the medium. Due to the dispersion of the medium and the fact that the two measuring beams have widely divergent wavelengths, a refractive index variation has a different effect on the two measuring beams. Then the signal of the detector 140 indicates a different traversed optical path length for the associated measuring beam 123 than the traversed optical path length indicated by the signal of the detector 141 for the associated measuring beam 125. In the circuit 200, it can be ascertained whether such a path length difference occurs. The output signal 201 of this circuit, which comprises information about this path length difference, is applied to a further component 205 of the signal-processing electronic circuits. A table is stored in a memory of this component, indicating which refractive index variation is associated with a given path length difference. The refractive index variation thus determined at the output 206 of the component 205 may be used to correct the actual measuring signal of the measuring axis shown in FIG. 7.

In addition to the embodiment of FIG. 7, in which the measuring beams 123 and 125 and the reference beams 124 and 126 are sent twice to the measuring mirror and the reference mirror, respectively, the invention may also be used in an embodiment in which the measuring beams and the reference beams are sent only once to their respective mirrors. Such an embodiment differs from that in FIG. 7 in that the retroreflector 135 is removed and the beam splitter 138 is placed at its position. The detectors 140 and 141 are then placed in the paths of the beams separated by this beam splitter. The advantage of sending the measuring beams to the measuring mirror twice is that, even at unwanted tilts of the measuring mirror, the direction of the measuring beams exiting from the system remains correctly equal to that of the associated reference beams, so that each measuring beam correctly coincides with the associated reference beam at the location of the associated detector.

Figure 8:
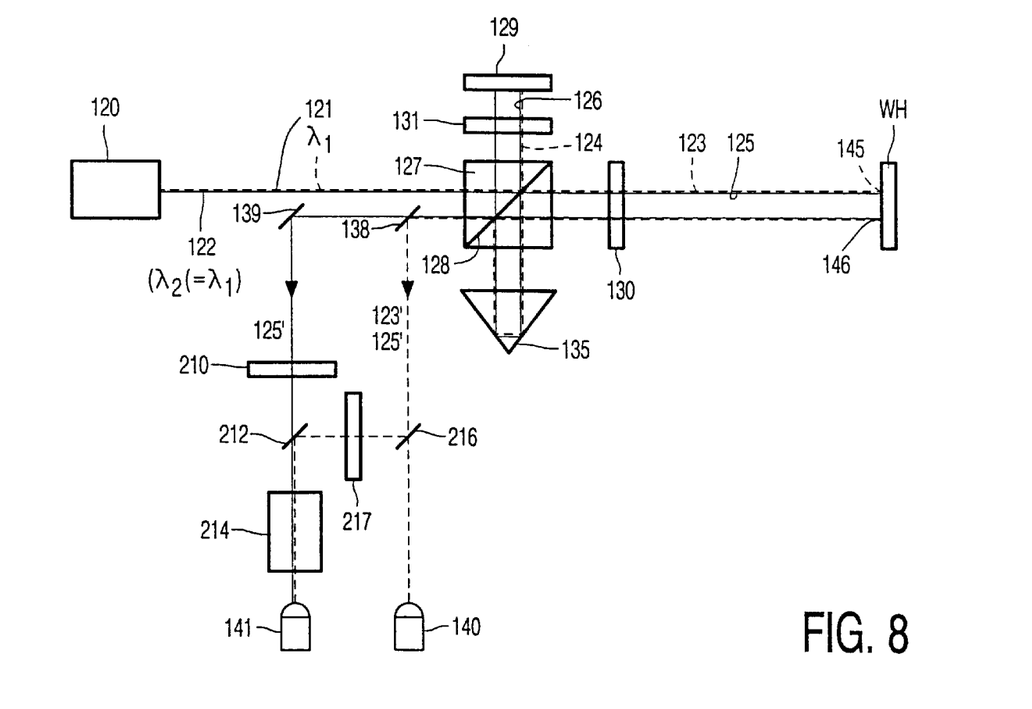
FIG. 8 shows a second embodiment of such a system.

FIG. 8 shows an embodiment of the interferometer system in which only the laser beam 121 is used for the actual distance measurement, while the laser beam 122 together with the measuring beam 123 are used for measuring the refractive index variations. In this Figure, the elements corresponding to those of FIG. 7 are denoted by the same reference numerals. The embodiment of FIG. 8 differs from that in FIG. 7 in that the detection portion, i.e. the portion after the elements 138 and 139, has a different construction. The measuring beam 123' reflected twice by the measuring mirror $R_1$ and the associated reference beam 124' reach their detector 140 in the same way as in FIG. 7, which detector again supplies a signal which is indicative of the position or displacement of the measuring mirror. The path of the measuring beam 125' reflected twice by the measuring mirror incorporates, behind the reflector 139, a polarization analyzer 210 whose direction of polarization corresponds to that of the measuring beam 125'. The reference beam 126' associated with this measuring beam is blocked thereby and only the measuring beam 125' is passed to the detector 141. The path of this measuring beam incorporates a frequency-converting element 214 which reduces the wavelength of this beam three times so that this beam acquires the same wavelength as that of measuring beam 123'. The path of the beam 123' incorporates, behind the wavelength-selective beam splitter 138, a neutral beam splitter 216 which reflects a part of the radiation of this beam to a wavelength-selective beam splitter 212. A polarization analyzer 217 whose direction of polarization corresponds to that of the measuring beam 123' is arranged between the reflectors 216 and 212, so that only radiation from this measuring beam and no radiation from the reference beam 124' is passed to the beam splitter 212. This beam splitter passes the measuring beam 125' and reflects the split radiation of the measuring beam 123', thus ensuring that these beams are jointly incident on the detector 141. The phase difference between these beams then comprises information about possibly occurring refractive index variations in the medium which is traversed by the measuring beams. The signal from the detector 141 may be further processed in an analogous way as described in U.S. Pat. No. 5,404,222 for the two separate test beams.

The detection portion of the embodiment of FIG. 8 may also have a different construction. The only requirement is that the two measuring beams reaching the detector 141 have the same wavelength and direction of polarization.

Instead of a laser source, which comprises only one laser, the embodiments of FIGS. 7 and 8, or their modifications, may also comprise a laser source with two lasers, in which the wavelength of one of these lasers is three times as large as that of the other laser. It should then be ensured that the wavelength difference is maintained correctly.

This choice of the wavelength difference not only provides the advantage that the refractive index variations can be measured more accurately than in the case where the wavelengths only differ by a factor of two, but also the practically important advantage that the optical interference filters which are present in the system and must be suitable for the two wavelengths can be manufactured in a relatively easy manner.

A first filter of this type is the interface 128 of the polarization-sensitive beam splitter 127. This filter may be composed of a first layer packet alternately having a higher and a lower refractive index, constituting an optimal $\lambda/4$ structure for the wavelength of 355 nm, and a second layer packet also alternately having a higher and a lower refractive index and constituting an optimal $3\lambda/4$ structure for this wavelength, and hence an optimal $\lambda/4$ structure for the wavelength of 1064 nm. The layers having the higher refractive index may consist of hafnium dioxide ($HfO_2$), and the layers having the lower refractive index may consist of silicon dioxide ($SiO_2$).

Table 1 shows the composition of the polarization-separating filter for a reference wavelength of 355 nm. The reference QWOT in this Table denotes the quarter wavelength optical thickness, i.e. $n.d/\lambda$, in which n is the refractive index of the material of the layer and d is the geometrical thickness of this layer.

TABLE 1

| Layer | Material | QWOT | Thickness (nm) |
|-------|----------|--------|----------------|
| 1 | HfO2 | 1.2438 | 55.15 |
| 2 | SiO2 | 1.7005 | 102.56 |
| 3 | HfO2 | 1.2438 | 55.15 |
| 4 | SiO2 | 1.7005 | 102.56 |
| 5 | HfO2 | 1.2438 | 55.15 |
| 6 | SiO2 | 1.7005 | 102.56 |
| 7 | HfO2 | 3.7314 | 165.46 |

TABLE 1-continued

| Layer | Material | QWOT | Thickness (nm) |
|---|---|---|---|
| 8 | SiO2 | 5.1014 | 307.68 |
| 9 | HfO2 | 3.7314 | 165.64 |
| 10 | SiO2 | 5.1014 | 307.68 |
| 11 | HfO2 | 3.7314 | 165.64 |
| 12 | SiO2 | 5.1014 | 307.68 |
| 13 | HfO2 | 3.7314 | 165.64 |
| 14 | SiO2 | 5.1014 | 307.68 |
| 15 | HfO2 | 3.7314 | 165.64 |
| 16 | SiO2 | 5.1014 | 307.68 |
| 17 | HfO2 | 3.7314 | 165.64 |

Figure 9:
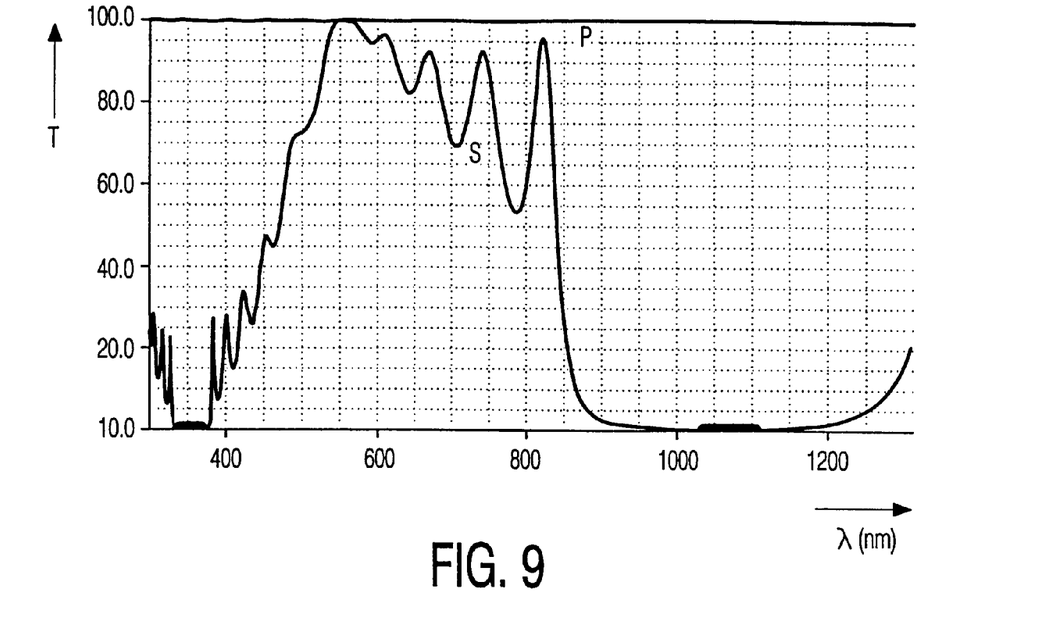
FIG. 9 shows the transmission/wavelength curve of an embodiment of a polarization-separating interference filter.

FIG. 9 shows the behavior of the polarization filter of Table 1 in the form of a transmission (T) versus wavelength ($\lambda$) curve for P-polarized radiation (the measuring beams 123 and 125 in the previous Figures) and for S-polarized radiation (the reference beams 124 126). It is evident from this Figure that the filter for the S polarization has the desired high reflection (low transmission) for the chosen wavelengths of 355 nm and 1064 nm.

Also the wavelength-selective beam splitters, 138 in FIGS. 7 and 8 and 212 in FIG. 9, can be realized relatively easily and with the desired accuracy. Table 2 shows the position of an embodiment of the wavelength-selective filter.

TABLE 2

| Layer | Material | QWOT | Thickness (nm) |
|---|---|---|---|
| 1 | HfO2 | 0.5504 | 24.78 |
| 2 | SiO2 | 1.1086 | 67.83 |
| 3 | HfO2 | 1.0470 | 47.41 |
| 4 | SiO2 | 1.0065 | 61.58 |
| 5 | HfO2 | 1.1127 | 50.10 |
| 6 | SiO2 | 1.1493 | 70.32 |
| 7 | HfO2 | 0.9579 | 43.13 |
| 8 | SiO2 | 1.2557 | 76.83 |
| 9 | HfO2 | 0.9923 | 44.68 |
| 10 | SiO2 | 1.0766 | 65.87 |
| 11 | HfO2 | 1.1697 | 52.66 |
| 12 | SiO2 | 0.9899 | 60.56 |
| 13 | HfO2 | 1.0733 | 48.32 |
| 14 | SiO2 | 1.2284 | 75.16 |
| 15 | HfO2 | 0.8527 | 38.39 |
| 16 | SiO2 | 1.3338 | 81.60 |
| 17 | HfO2 | 1.0051 | 45.25 |
| 18 | SiO2 | 0.9339 | 57.14 |
| 19 | HfO2 | 1.4647 | 65.95 |
| 20 | SiO2 | 0.7343 | 44.93 |
| 21 | HfO2 | 1.1268 | 50.73 |
| 22 | SiO2 | 2.2828 | 139.67 |

Figure 10:
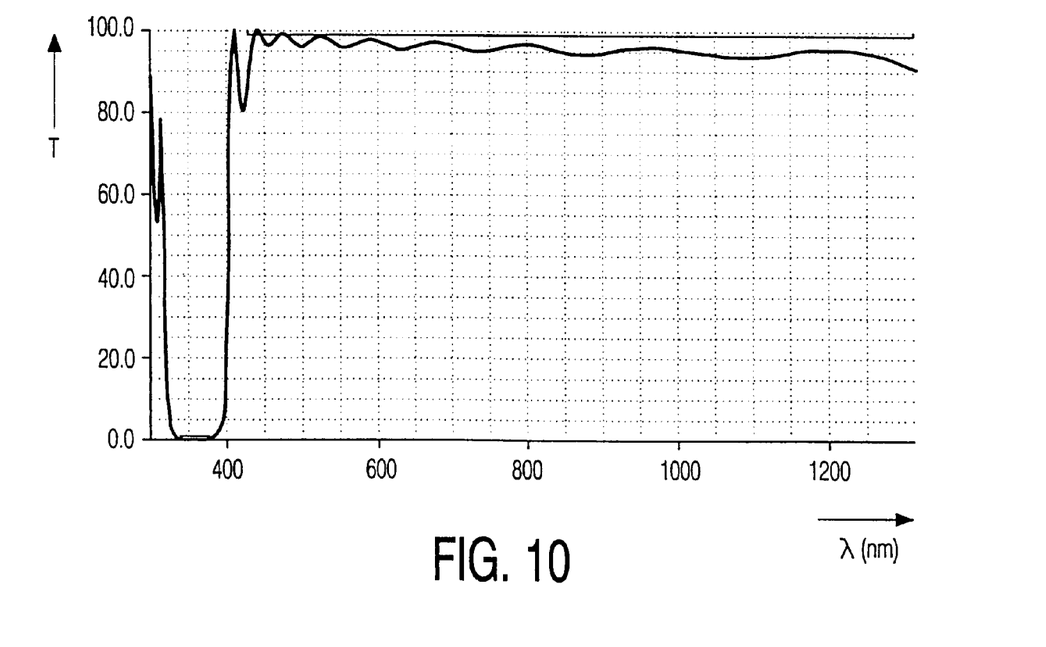
FIG. 10 shows such a curve of an embodiment of a wavelength-separating filter.

FIG. 10 shows the behavior of the wavelength-selective filter of Table 2 in the form of a transmission/wavelength curve. This filter indeed has the desired high transmission for the wavelength of 1064 nm and the desired high reflection for the wavelength of 355 nm.

Also the interference filters, which must be provided as antireflective coatings on the external surfaces of the optical elements, can be readily manufactured with the desired quality. Table 3 shows the composition of an embodiment of an antireflection filter.

TABLE 3

| Layer | Material | QWOT | Thickness (nm) |
|---|---|---|---|
| 1 | Y2O3 | 6.000 | 292.81 |
| 2 | MgF2 | 6.000 | 375.75 |
| 3 | Y2O3 | 3.000 | 146.40 |
| 4 | MgF2 | 3.000 | 187.88 |

Figure 11:
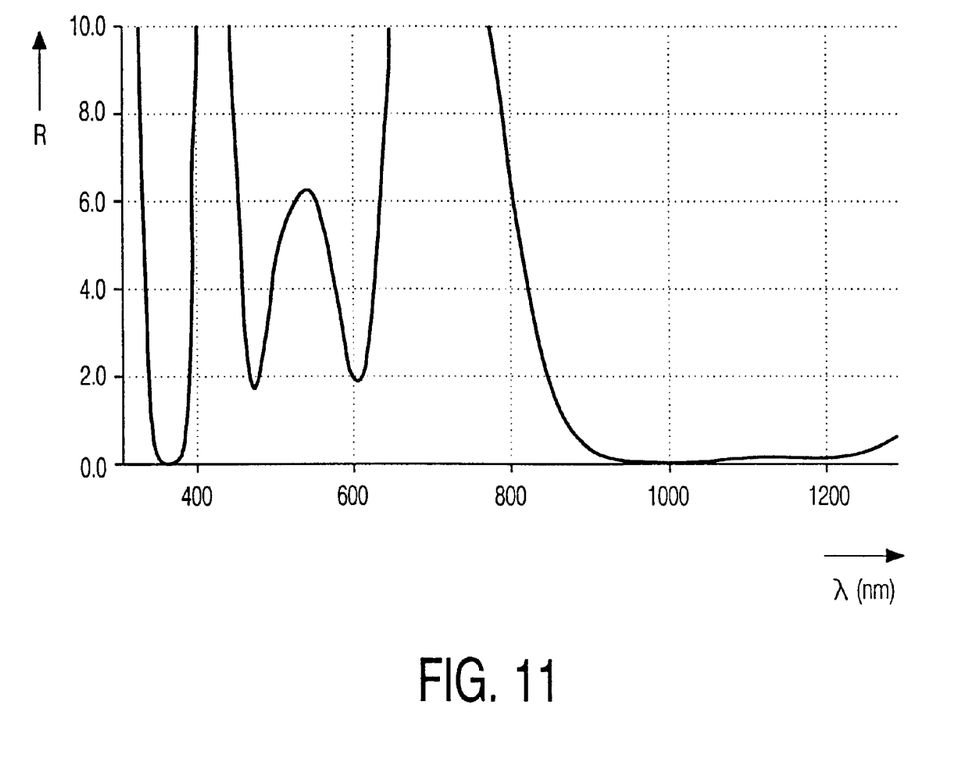
FIG. 11 shows a reflection/wavelength curve of an embodiment of an antireflective interference filter.

FIG. 11 shows the behavior of the antireflection filter of Table 3 in the form of a reflection (R) versus wavelength curve. The reflection is indeed substantially zero for the wavelengths of 355 nm and 1064 nm.

The interferometer system including the novel system for detecting refractive index variations has been described hereinbefore with reference to its use in a photolithographic reduction apparatus for manufacturing IC structures. However, the invention is also applicable in photolithographic apparatuses which are used for manufacturing other structures such as integrated planar optical structures, guidance and detection patterns of magnetic domain memories, magnetic heads, or structures of liquid crystalline display panels. The interferometer system including the novel detection system is also applicable in lithographic apparatuses in which radiation other than optical radiation such as ion radiation, electron radiation or X-ray radiation is used for imaging the mask pattern, either with or without reduction. The image may be a projection image or a proximity image. The invention is also applicable outside the field of lithography and generally in those cases where very accurate measurements must be performed via a medium in which refractive index variations may occur.

What is claimed is:

1. An interferometer system having at least one measuring axis, comprising:
    a measuring mirror;
    a reference mirror;
    a radiation source that provides a first coherent monochromatic beam having a first wavelength and a second coherent monochromatic beam having a second wavelength, the wavelength of the second beam being larger than the wavelength of the first beam by a factor of N, where N is an odd integer;
    a beam splitter having a quarter wavelength dependency that splits the first beam into a first measuring beam and a first reference beam and that guides the first measuring beam along a measuring path to said measuring mirror and that guides the first reference beam along a reference path to said reference mirror;
    said beam splitter splitting the second beam into a second measuring beam and a second reference beam, said beam splitter guiding the second measuring beam along the measuring path to the measuring mirror and guiding the second reference beam along the reference path to the reference mirror;
    a first displacement detector that detects a displacement of the measuring mirror based on an interference pattern formed by the first measuring beam reflected from the measuring mirror and the fist reference beam reflected from the reference mirror; and
    a second displacement detector that detects disturbances in the medium in which the first measuring beam propagates based on the first measuring beam and the second coherent monochromatic beam reflected by the measuring mirror.

2. An interferometer system as claimed in claim 1, wherein the second coherent monochromatic beam constitutes a test beam, and the detected phase difference between the first measuring beam and the test beam is indicative of said disturbances.

3. An interferometer system as claimed in claim 1, wherein the second measuring beam and the second reference beam traverse the measuring path and reference path as the first measuring beam and the first reference beam, respectively.

4. An interferometer system as claimed in claim 1, characterized in that the laser source comprises a single, continuous laser and a wavelength convertor.

5. An interferometer system as claimed in claim 4, wherein the second coherent monochromatic beam has a wavelength of 1064 nm and the first coherent monochromatic beam has a wavelength of approximately 355 nm.

6. An interferometer system as claimed in claim 1, the interferometer system having three measuring axes, wherein two coherent monochromatic beams having wavelengths which are a factor of three different from each other are provided and separate first and second detection means are available for each measuring axis.

7. An interferometer system as claimed in claim 1, having at least five measuring axes, wherein two coherent monochromatic beams having wavelengths which are a factor of three different from each other are provided and separate first and second detection means are available for each measuring axis.

8. A lithographic projection apparatus for repetitively imaging a mask pattern on a substrate, the apparatus comprising an illumination unit for supplying a projection beam, a mask table with a mask holder, a substrate table with a substrate holder, a projection system arranged in the path of the projection beam, and an optical measuring system for measuring positions and orientations of the substrate, wherein the measuring system is an interferometer system as claimed in claim 1.

9. A lithographic projection apparatus as claimed in claim 8, wherein the mask pattern is imaged on each substrate field by way of scanning and wherein a measuring system is present for measuring the positions of the mask, wherein said measuring system is an interferometer system as claimed in claim 1.

10. A lithographic projection apparatus as claimed in claim 8, wherein the measuring system for the substrate and that for the mask are integrated in a differential interferometer system, characterized in that two coherent monochromatic beams having wavelengths which are a factor of three different and separate first and second detection means are available for each measuring axis of the differential interferometer system.

11. The interferometer system of claim 1, wherein the second detector includes a frequency converter that changes the wavelength of the second measuring beam to be substantially equal to the wavelength of the first measuring beam, said second detector further including a phase detector that detects a phase difference between the first measuring beam and the second wavelength converted measuring beam.

12. The interferometer system of claim 1, wherein the second detector includes a comparison circuit that compares signals indicative of the first measuring beam and the second laser beam.

13. The interferometer system of claim 1, wherein the beam splitter operates to make the interferometer independent of tilts in the measuring mirror by guiding the first and second reference beams to traverse the reference path twice and guiding the first and second measuring beams to traverse the measuring path twice.

14. The interferometer system of claim 1, wherein the radiation source is a laser.

15. The interferometer system of claim 1, wherein N is equal to three.

16. An interferometer system having at least one measuring axis, comprising:

a measuring mirror;

a reference mirror;

a radiation source that supplies a first coherent monochromatic beam having a first wavelength and a second coherent monochromatic beam having a second wavelength that is approximately three times the first wavelength;

a polarization-sensitive beam splitter that splits the first beam into a first measuring beam and a first reference beam and that guides the first measuring beam along the measuring path to the measuring mirror and that guides the first reference beam along a reference path to the reference mirror, the beam splitter comprising an optical interference filter in the form of a multilayer structure, consecutive layers of which alternately have a higher and a lower refractive index, the interference filter having a first layer packet which is suitable as a quarter-$\lambda$ element for the second wavelength of the second beam, and a second layer packet which is suitable as a broadband quarter-$\lambda$ element for the first wavelength of the first beam;

a first displacement detector that detects a displacement of the measuring mirror based on an interference pattern formed by the first measuring beam reflected from the measuring mirror and the first reference beam reflected from the reference mirror; and a second displacement detector that detects disturbances in the medium in which the first measuring beam propagates based on the first measuring beam and the second coherent monochromatic beam reflected by the measuring mirror.

17. The interferometer system of claim 16, wherein the radiation source is a laser.

18. The interferometer system of claim 14, wherein the radiation source is a laser.

19. An interferometer system having at least one measuring axis, comprising:

a measuring mirror;

a reference mirror;

a radiation source that supplies a first coherent monochromatic beam having a first wavelength and a second coherent monochromatic beam having a second wavelength that is approximately three times the first wavelength;

a beam splitter that splits the first beam into a first measuring beam and a first reference beam and that guides the first measuring beam along the measuring path to the measuring mirror and that guides the first reference beam along a reference path to the reference mirror, wherein the outer surfaces of optical elements of the beam splitter are provided with an antireflective structure in the form of an optical interference filter, the interference filter comprising four layers alternately having a higher and a lower refractive index, the third layer having the same refractive index as the first layer and a thickness which is equal to half that of the first layer, and the fourth layer having the same refractive index as the second layer and a thickness which is equal to half that of the second layer;

a first displacement detector that detects a displacement of the measuring mirror based on an interference pattern formed by the first measuring beam reflected from the measuring mirror and the first reference beam reflected from the reference mirror; and a second displacement detector that detects disturbances in the medium in which the first measuring beam propagates based on the first measuring beam and the second coherent monochromatic beam reflected by the measuring mirror.

20. An interferometer system having at least one measuring axis, comprising:

a measuring mirror;

a reference mirror;

a radiation source that supplies a first coherent monochromatic beam having a first wavelength and a second coherent monochromatic beam having a second wavelength, the wavelength of the second beam being larger than the wavelength of the first beam by a factor of N, where N is an odd integer;

a beam splitter that splits the first coherent monochromatic beam into a first measuring beam and a first reference beam, said beam splitter constructed and arranged to guide the first measuring beam along a measuring path to said measuring mirror and guide the first reference beam along a reference path to said reference mirror;

a first displacement detector that detects a displacement of the measuring mirror by detecting an interference pattern formed by the first measuring beam reflected by the measuring mirror and the first reference beam reflected by the reference mirror;

a second displacement detector that detects disturbances in the medium in which the first measuring beam propagates by detection of radiation from the first measuring beam reflected by the measuring mirror, and detection of radiation from the second coherent monochromatic beam reflected by the measuring mirror; wherein said beam splitter includes an optical interference filter having a multilayer structure with alternating layers of higher and lower refractive indices.

21. An interferometer system according to claim 20, wherein said layer of higher refractive index comprises hafnium dioxide, and wherein said layer of lower refractive index comprises silicon dioxide.

22. An interferometer system according to claim 21, wherein said first wavelength is about 355 nm and wherein said second wavelength is about 1064 nm.

23. The interferometer system of claim 14, wherein the radiation source is a laser.

24. The interferometer system of claim 20, wherein N is equal to three.

* * * * *